US010672267B1

(12) United States Patent
Nagata

(10) Patent No.: US 10,672,267 B1
(45) Date of Patent: Jun. 2, 2020

(54) SMART NOTIFICATION CENTER

(71) Applicant: Toyota Motor Engineering & Manufacturing North America, Inc., Plano, TX (US)

(72) Inventor: Katsumi Nagata, Foster City, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/261,471

(22) Filed: Jan. 29, 2019

(51) Int. Cl.
*G08G 1/09* (2006.01)
*G07C 5/08* (2006.01)
*H04W 4/40* (2018.01)

(52) U.S. Cl.
CPC ............ *G08G 1/093* (2013.01); *G07C 5/0816* (2013.01); *H04W 4/40* (2018.02)

(58) Field of Classification Search
CPC ........ G08G 1/093; H04W 4/40; G07C 5/0816
USPC ......................................................... 340/905
See application file for complete search history.

(56) References Cited

U.S. PATENT DOCUMENTS

| 5,289,184 | A | 2/1994 | Suzuki |
| 6,334,089 | B2 | 12/2001 | Hessing |
| 7,542,839 | B2 | 6/2009 | Wagner et al. |
| 7,796,056 | B2 | 9/2010 | Fein et al. |
| 8,751,152 | B2 | 6/2014 | Geelen et al. |
| 9,457,661 | B2 | 10/2016 | Restauri, III et al. |
| 9,506,781 | B2 | 11/2016 | Skaff et al. |
| 9,836,971 | B2 | 12/2017 | Nykamp |
| 9,979,826 | B1 | 5/2018 | Hajdu et al. |
| 10,012,515 | B2 | 7/2018 | Wesselius et al. |
| 10,035,518 | B2 | 7/2018 | George-Svahn et al. |
| 10,144,289 | B2 | 12/2018 | Lee et al. |
| 10,163,342 | B2 | 12/2018 | Kweon et al. |
| 2004/0044472 | A1 | 3/2004 | Tsuge et al. |
| 2009/0261958 | A1* | 10/2009 | Sundararajan ...... B60R 21/0132 340/436 |
| 2015/0260529 | A1 | 9/2015 | Petersen |
| 2015/0269793 | A1* | 9/2015 | Collins ................ G07C 5/0808 701/31.4 |
| 2019/0265965 | A1* | 8/2019 | Acharya ................ H04L 12/40 |

* cited by examiner

*Primary Examiner* — Tanmay K Shah
(74) *Attorney, Agent, or Firm* — Snell & Wilmer L.L.P.

(57) ABSTRACT

A system for controlling notifications in a vehicle includes an output device, a sensor to detect at least one of a vehicle condition or an environment of the vehicle, and a memory to store a notification center including notifications to be output by the output device. The system further includes an ECU to determine a new notification to be added to the notification center based on the sensor data and to add the new notification to the notification center. The ECU is further designed to determine a priority of each of the notifications in the notification center and to control the output device to output a highest priority notification from the notification center. The ECU is further designed to identify an obsolete notification to be removed from the notification center based on the sensor data. The ECU is further designed to remove the obsolete notification from the notification center.

20 Claims, 6 Drawing Sheets

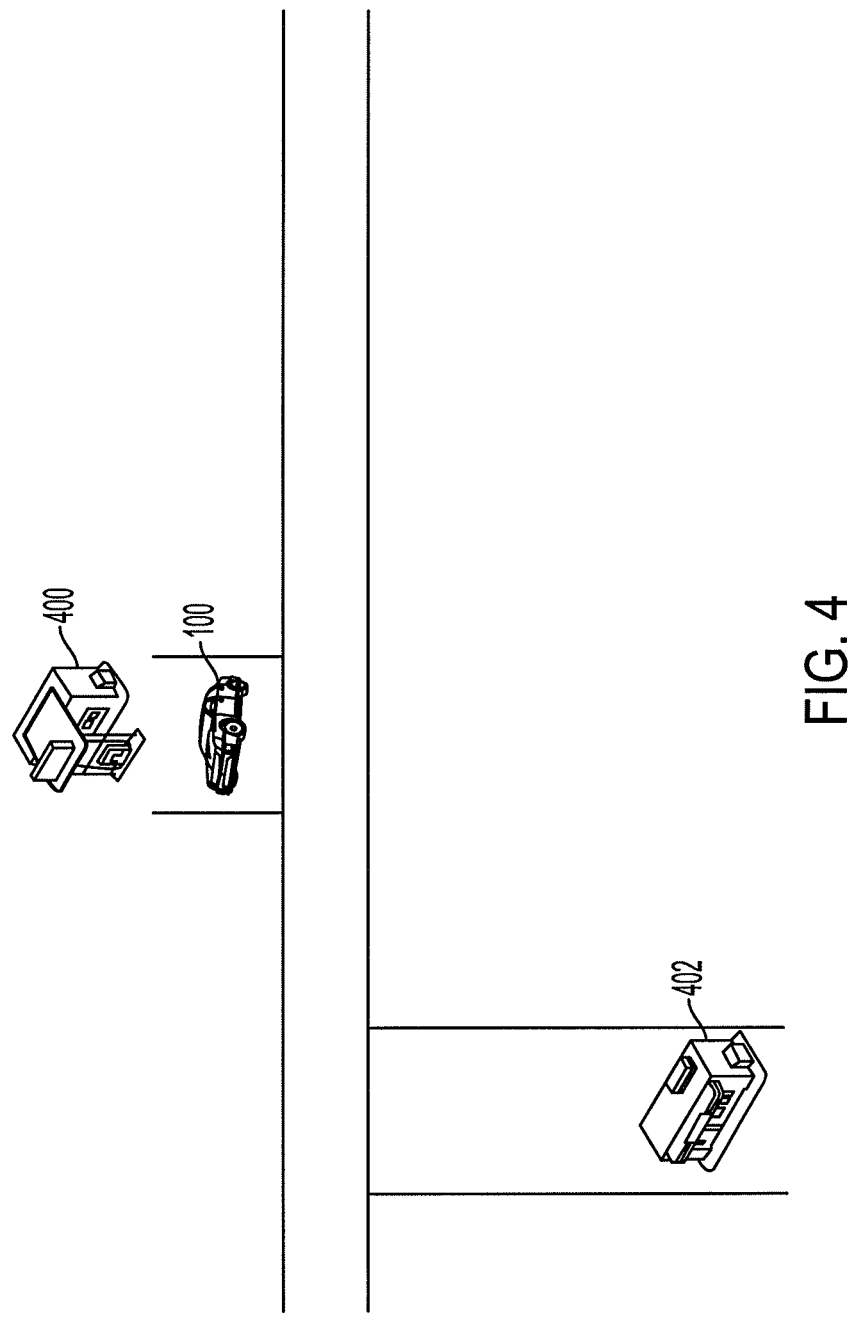

SMART NOTIFICATION CENTER

BACKGROUND

1. Field

The present disclosure relates to systems and methods for controlling a vehicle to output smart notifications to a driver or to a user.

2. Description of the Related Art

Vehicles may output notifications to drivers. For example, current vehicles may output a notification to change the oil in a vehicle. As with replenishing oil, a specific combination of inputs is required to remove the notification, and the inputs are often only known by mechanics. This can lead to a large quantity of notifications being stored in the vehicle memory before being cleared by a mechanic.

Smartphones likewise provide notifications to users. Such notifications may include missed calls and texts, upcoming calendar entries, and the like. As with vehicles, these notifications must be manually removed. Therefore, a user who fails to regularly clear these notifications can become overburdened with a large list of notifications.

It is desirable therefore to develop systems and methods for providing smart notifications in a vehicle.

SUMMARY

Described herein is a system for controlling notifications in a vehicle. The system includes an output device designed to output data. The system further includes a sensor designed to detect sensor data corresponding to at least one of a vehicle condition of the vehicle or an environment of the vehicle. The system further includes a memory designed to store a notification center including notifications to be output by the output device. The system further includes an electronic control unit (ECU) coupled to the output device, the sensor, and the memory. The ECU is designed to determine a new notification to be added to the notification center based on the sensor data. The ECU is further designed to add the new notification to the notification center. The ECU is further designed to determine a priority of each of the notifications in the notification center. The ECU is further designed to control the output device to output a highest priority notification from the notification center. The ECU is further designed to identify an obsolete notification to be removed from the notification center based on the sensor data. The ECU is further designed to remove the obsolete notification from the notification center.

Also described is a system for controlling notifications in a vehicle. The system includes an output device designed to output data. The system further includes a sensor designed to detect sensor data corresponding to at least one of a vehicle condition of the vehicle or an environment of the vehicle. The system further includes a memory designed to store a notification center including notifications to be output by the output device. The system further includes an electronic control unit (ECU) coupled to the output device, the sensor, and the memory. The ECU is designed to predict a user desired action to be performed by a vehicle user based on the sensor data. The ECU is further designed to determine a new notification to be added to the notification center based on the user desired action. The ECU is further designed to add the new notification to the notification center. The ECU is further designed to determine a priority of each of the notifications in the notification center. The ECU is further designed to control the output device to output a highest priority notification from the notification center. The ECU is further designed to identify an obsolete notification to be removed from the notification center. The ECU is further designed to remove the obsolete notification from the notification center.

Also described is a method for controlling notifications in a vehicle. The method includes detecting, by a sensor, sensor data corresponding to at least one of a vehicle condition of the vehicle or an environment of the vehicle. The method further includes storing, in a memory, a notification center including notifications to be output by an output device. The method further includes determining, by an electronic control unit (ECU), a new notification to be added to the notification center based on the sensor data. The method further includes adding, by the ECU, the new notification to the notification center. The method further includes determining, by the ECU, a priority of each of the notifications in the notification center. The method further includes controlling, by the ECU, the output device to output a highest priority notification from the notification center. The method further includes identifying, by the ECU, an obsolete notification to be removed from the notification center based on the sensor data. The method further includes removing, by the ECU, the obsolete notification from the notification center.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 4 is a drawing illustrating an exemplary use of the method of FIGS. 2A, 2B, and 2C by the vehicle of FIG. 1 according to an embodiment of the present invention.

DETAILED DESCRIPTION

The present disclosure describes systems and methods for providing a smart notification center in a vehicle. The systems providing benefits and advantages such as removing unwanted or obsolete notifications from an output device, thus increasing the customer experience with the vehicle. The systems provide additional benefits and advantages such as predicting actions that the driver will desire to take and providing notifications to the driver that are associated with the predicted desirable action. The systems further advantageously learn driver behavior and preferences and determine notifications that suit the driver's behavior and preferences, further increasing the customer experience. The systems beneficially rank the notifications of the vehicle such that the most important notifications are given a higher priority and shown to the driver first, thus advantageously preventing a driver from missing a critical notification.

An exemplary system includes one or more sensor designed to detect data corresponding to a vehicle condition or an environmental condition in the environment of the vehicle. The system further includes an output device to output notifications, along with a memory that stores a notification center that includes multiple notifications. The system also includes an electronic control unit (ECU). The ECU can receive the sensor data, or other data (such as calendar data or an incoming call from a mobile device). The ECU may determine a notification to be added to the notification center based on the sensor data (or the data from the mobile device) and may assign a priority ranking to each of the notifications. The ECU may further determine when a notification has become obsolete and may control the output device to cease outputting the obsolete notification. In some embodiments, the ECU may output notifications to the mobile device corresponding to the vehicle owner or other vehicle user in various situations (such as a maintenance alert, a low fuel warning, a reservation, a receipt, or the like).

Figure 1:
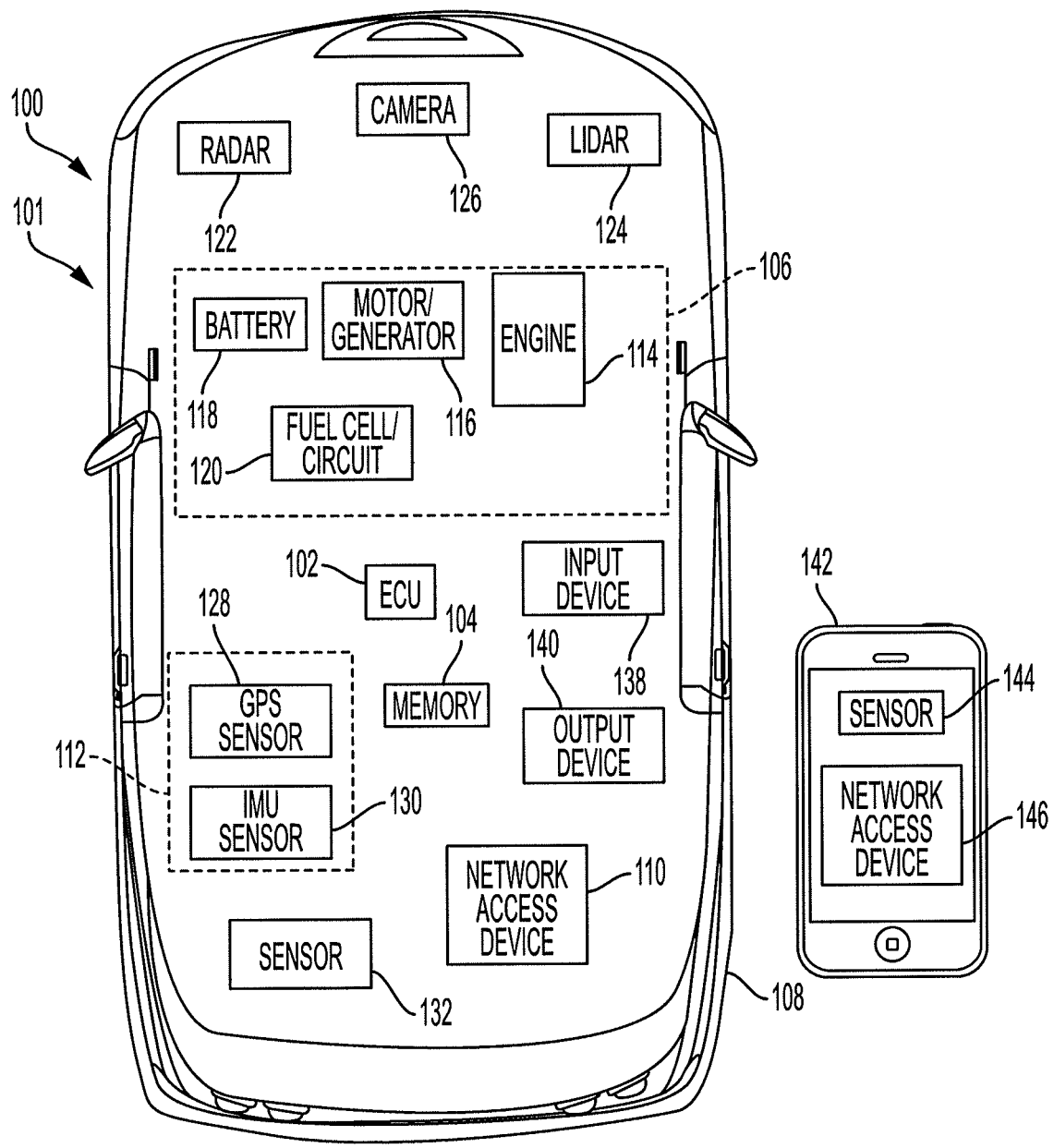
FIG. 1 is a block diagram illustrating a vehicle that includes a system for providing a smart notification center according to an embodiment of the present invention.

Turning to FIG. 1, a vehicle 100 includes a system 101 for providing a smart notification center. The vehicle 100 (or system 101) may include an ECU 102, a memory 104, a power source 106, and a main body 108. The vehicle 100 (or system 101) may further include a network access device 110, a location sensor 112, a radar sensor 122, a light imaging and ranging (lidar) sensor 124, a camera 126, and another sensor 132. The vehicle may also include an input device 138 and an output device 140.

The main body 108 may be propelled along a roadway, may be suspended in or on water, or may fly through air. The main body 108 may resemble a vehicle such as a car, a motorcycle, a boat, an aircraft, or the like. The main body 108 may further support an individual such as a driver, a passenger, or the like.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be used as a rideshare vehicle in an autonomous, semi-autonomous, or fully driver-operated state. The ECU 102 may control the memory 104 to store a notification center including one or more notifications to be output via the output device 140. For example, the ECU 102 may control the output device 140 to output notifications such as a missed call log, a received text message, an upcoming meeting, information indicating that a component of the vehicle 100 requires repair, information indicating that the vehicle 100 is nearly out of gas or electrical charge, or the like.

The memory 104 may include any non-transitory memory and may store data usable by the ECU 102. For example, the memory 104 may store a notification center including one or more notifications, may store instructions usable by the ECU 102 to drive autonomously, or the like.

The power source 106 may include any one or more of an engine 114, a motor-generator 116, a battery 118, or a fuel-cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage devices including a battery, a flywheel, a super capacitor, a thermal storage device, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 112 may include any sensor capable of detecting data corresponding to a current location of the vehicle 100. For example, the location sensor 112 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The sensor 132 may include any sensor capable of detecting data corresponding to an environment of the vehicle 100 or a vehicle condition of the vehicle 100. For example, the sensor 132 may include one or more of the location sensor 112, the radar sensor 122, the lidar sensor 124, the camera 126, a sensor capable of detecting a status of a vehicle component, a sensor capable of detecting environmental conditions, or the like. For example, the sensor 132 may include a voltage sensor, a current sensor, a temperature sensor, a pressure sensor, a fuel gauge, an airflow sensor, an oxygen sensor, a speed sensor, or the like.

The radar sensor 122, the lidar sensor 124, and the camera 126 may detect data corresponding to an environment of the vehicle 100. For example, one or more of these sensors may detect the presence of objects near the vehicle 100, may detect a distance between the vehicle 100 and a leading or following vehicle, or the like. This data may be used by the ECU 102 to autonomously control the vehicle.

The network access device 110 may transmit and receive messages from one or more remote device. The network access device 110 may include any network access device capable of communicating via a wireless protocol. For example, the network access device 110 may communicate via Bluetooth, Wi-Fi, a cellular protocol, vehicle to vehicle communications, Zigbee, or any other wireless protocol.

The network access device 110 may communicate with a remote device 142, such as a mobile device (e.g., a smartphone, a tablet, a laptop, or the like). The network access device 110 may communicate wirelessly with a network access device 146 of the remote device 142. For example, a sensor 144 of the remote device 142 may detect data (such as a location, image data, or the like) and the network access device 146 may transmit the detected data to the vehicle 100. Likewise, a memory of the remote device 142 may store data (such as calendar data) which may likewise be transmitted to the vehicle 100.

The input device 138 may include any one or more input device such as a button, a keyboard, a mouse, a touchscreen, a microphone, or the like. The input device 138 may receive input from a user of the vehicle 100 such as a driver or a passenger.

The output device 140 may include any output device such as a speaker, a display, a touchscreen, or the like. The output device 140 may output data to a user of the vehicle.

As mentioned above, the system 101 may be used to provide a smart notification center which may store notifications to be output to a user via the output device 140. For example, the sensor 132 may detect a low fuel level and the location sensor 112 may detect data indicating that the vehicle 100 is at a gas station. The ECU 102 may determine the location at the gas station by comparing the detected location data to map data. Based on determining that the vehicle is at the gas station with low fuel, the ECU 102 may control the output device 140 to output data asking whether the ECU should directly pay for gasoline via the network access device 110.

Figure 2A:
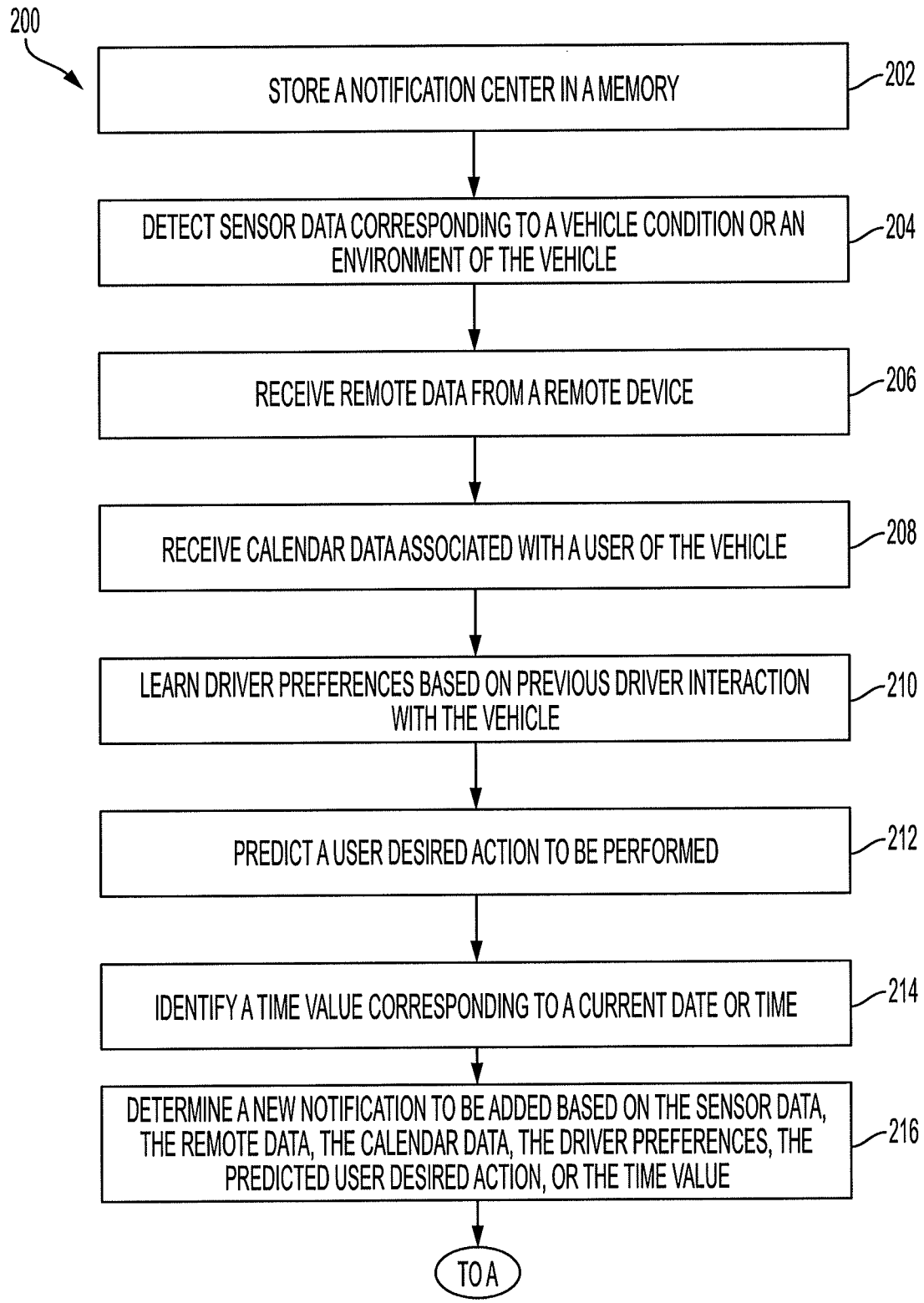
FIGS. 2A, 2B, and 2C are flowcharts illustrating an exemplary method for providing a smart notification center in a vehicle according to an embodiment of the present invention.
Figure 2B:
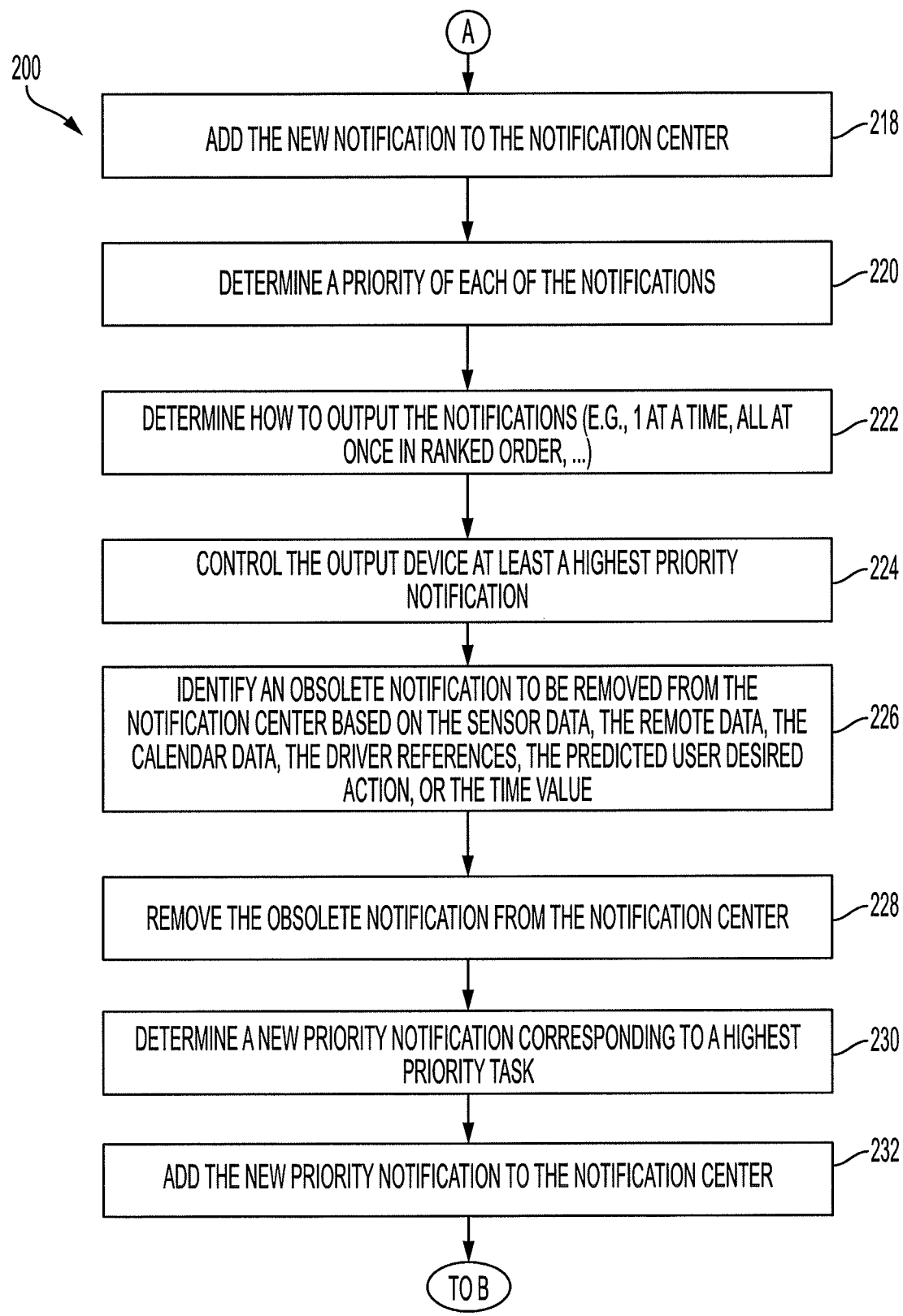
Figure 2C:
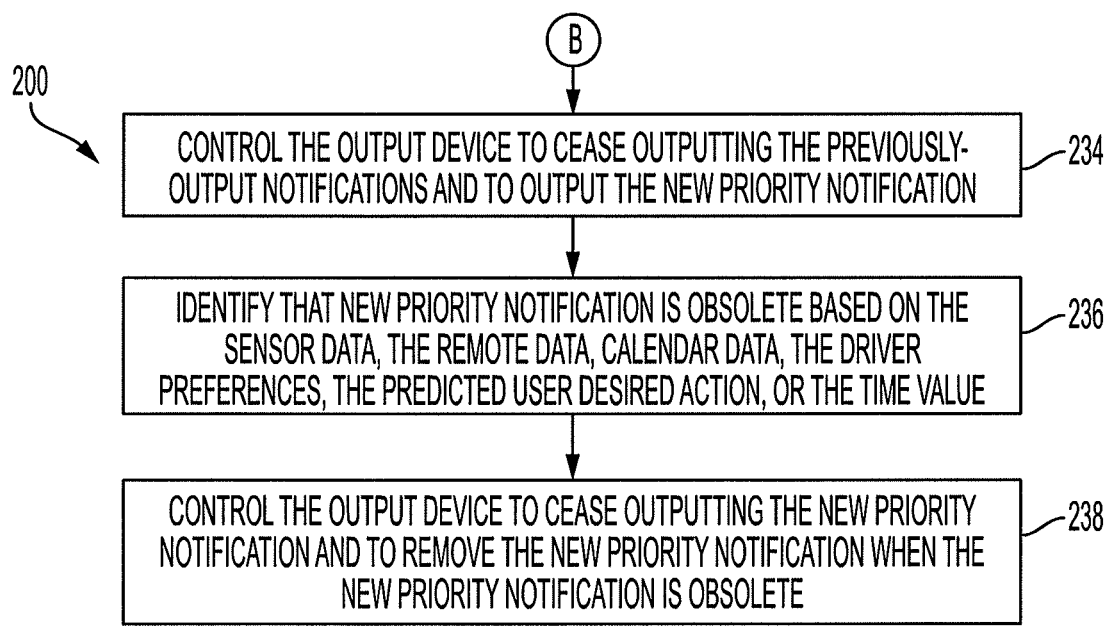

Referring now to FIGS. 2A, 2B, and 2C, a method 200 for providing a smart notification center for a vehicle, such as the vehicle 100 of FIG. 1, is shown. In block 202, the ECU may control a memory to store a notification center. The notification center may include a plurality of notifications that may be determined by the ECU or may be provided by a remote device that is in electrical communication with the ECU (such as via a network access device). The notification center may include such notifications as identification of a missed telephone call, a notification that the vehicle is low on gasoline, a notification of an upcoming meeting, an indication that a vehicle component requires repair, or the like.

In block 204, one or more sensor of the vehicle may detect sensor data that corresponds to a vehicle condition or an environment of the vehicle. For example, the sensor data may include image data, radar data, lidar data, pressure data, temperature data, voltage data, current data, fuel level data, traffic data, or the like.

In block 206, the ECU of the vehicle may receive remote data from a remote device. For example, the remote data may include data detected by a sensor of the remote device (such as a location of the remote device), data stored in a memory of the remote device (such as calendar data or email data), or the like.

In block 208, the ECU may receive calendar data associated with a user of the vehicle. For example, the calendar data may include a list of upcoming appointments and corresponding times. The calendar data may be received via the remote device or from a memory of the vehicle. For example, the vehicle may sync with a mobile device such that the memory of the vehicle receives calendar data from the remote device.

In block 210, the ECU of the vehicle may learn driver preferences based on previous driver interaction with the vehicle. For example, the ECU may learn whether the driver prefers to pay for gasoline via the vehicle or via another means (such as via credit card). As another example, the ECU may learn whether the driver wishes to see text messages while driving, or to receive voice calls while driving. As yet another example, the ECU may learn whether the driver prefers to see messages regarding desirable vehicle repairs while driving, or only upon reaching a destination. Additionally, the ECU may learn whether the driver prefers to change tires or brake pads when the respective components still have some remaining life or at the end of their useful life. Additionally, the ECU may learn driver preferences regarding air pressure in the tires, a fuel level at which the driver prefers to refuel the vehicle, or the like.

In block 212, the ECU may predict a user desired action to be performed. For example, the ECU may predict the user desired action based on one or more of the sensor data, the remote data, the calendar data, or the driver preferences. The user desired action may include to fill the vehicle with gasoline, to charge a battery of the vehicle, to pay for gasoline or electricity via the vehicle, to answer a phone call, to display or read a received text, or the like.

In block 214, the ECU may identify a time value corresponding to a current date or time. For example, the ECU may include, or may be coupled to, a clock that may provide this time value. The time value may include a current date or time, a timer (such as a timer started at the beginning of each notification being added to the notification center), or the like.

In block 216, the ECU may determine a new notification to be added to the notification center. The new notification may be determined based on one or more of the sensor data, the remote data, the calendar data, the driver preferences, the predicted user desired action, or the time value.

For example, the sensor data may indicate that a tire is low on pressure based on tire pressure sensor data, and the ECU may determine a corresponding notification. As another example, the location sensor may detect data indicating that the vehicle is at a gas station, and the ECU may generate a notification requesting whether the driver wishes for the vehicle to pay for gas directly. As yet another example, the ECU may learn that the driver prefers to refill gasoline when the tank is one quarter full, and the ECU may output a notification indicating that the driver may wish to refuel when the gas tank reaches or drops below one quarter of its capacity.

As yet another example, the ECU may learn that the driver prefers to answer phone calls while driving and may generate a notification indicating that a call is being received on a mobile device. However, if the ECU learns that the driver prefers to not speak on the telephone while driving, the ECU may fail to generate a notification of a phone call until the vehicle has come to a complete stop.

As yet another example, the ECU may receive calendar information from a remote device and may generate a notification that a meeting is forthcoming at a predetermined amount of time before the meeting is scheduled to occur. The predetermined amount of time may be a set amount of time or may correspond to an amount of time it will take for the vehicle to reach the location of the meeting (potentially plus a buffer amount of time).

As another example, the ECU may predict a route for the driver to take at the beginning of a commute (such as based on previous driving history, driver preferences regarding traffic and highways, or the like). The ECU may generate a notification, such as a notification indicating the desired route or including navigation instructions, in response to predicting the route.

In some embodiments, the ECU may determine additional information corresponding to the notification. For example, the ECU may determine a new notification that the vehicle should refuel. The ECU may adjust the notification to further include a location of a gas station along the route, or directions to the nearest gas station. As another example, the ECU may determine the location of a gas station with the least expensive fuel within a predetermined distance of the vehicle and output the location of the gas station with the least expensive fuel.

In block 218, the ECU may control the memory to add the new notification determined in block 216 to the notification center. For example, the notification center may include a list, and contents, of all active notifications. The notifications may be ordered based on priority or may be randomly stored in the notification center. For example, each of the notifications may be added in the order in which they are received, and each may or may not include a priority ranking. As another example, the notification center may include a list of notifications starting from the highest priority notification.

In block 220, the ECU may determine a priority for each of the notifications. The priority may be based on an algorithm, based on driver preferences, or the like. For example, the ECU may include an algorithm that it uses to prioritize notifications. As an example operation of an algorithm, a notification corresponding to improper operation of a vehicle component that is required for driving may be ranked higher than a notification to refuel the vehicle. As another example of an algorithm, a notification corresponding to extremely low tire pressure in a tire may be ranked higher than a notification corresponding to a missed telephone call.

As an example of learning driver preference, the ECU may learn that phone calls from a client are important to the driver (e.g., by learning that the driver always answers calls from contacts labeled "client"), and the ECU may rank incoming calls from clients as a high priority item. As another example, the ECU may learn that refueling the vehicle when it is below a quarter full is a high priority (e.g., by learning that the driver always refuels when the tank is around a quarter full), and the ECU may rank refueling as a high priority notification when the tank reaches or drops below a quarter full.

In block 222, the ECU may determine how to output the notifications. For example, the ECU may make this determination based on an algorithm, based on user-selected settings, or based on driver behavior. In some embodiments, the determinations made in block 222 may likewise include information such as whether to cycle through notifications, whether to cease outputting notifications after a predetermined amount of time, or the like. In some embodiments, the ECU may determine, based on programming or based on user-provided input, to transmit certain notifications or certain types of notifications to a mobile device associated with a user. For example, the ECU may determine to transmit all maintenance alerts, fuel-related warnings, reservations, receipts, or the like to the mobile device.

As an example of an algorithm determination, the ECU may be programmed to always output two notifications at any given time. As another example, the ECU may be programmed to always output all notifications with the highest priority (e.g., if notifications are prioritized from 1-5 with 5 being highest priority then the ECU may determine to output all notifications with a priority of 5).

As an example of user-selected settings, the user may use the vehicle interface to provide input indicating that outputting only one notification at a time is preferable. As another example, the user may provide input indicating that all vehicle-related notifications should be output (as opposed to telephone-related notifications).

As an example of driver behavior settings, the ECU may learn that a driver only pays attention to the highest-priority notification. For example, the ECU may learn that, although there are 5 notifications listed, the driver only pays attention to the top listed notification. The ECU may learn this, for example, if the driver always refuels when refueling is the highest priority notification, if the driver always requests for a text to be read aloud if the text is the highest priority notification, or the like.

In block 224, the ECU may control the output device to output at least the highest priority notification. The ECU may control the output device to output additional notifications as well based on the determinations made in block 222. If the determination in block 222 includes transmitting the notification to the mobile device, the ECU may control the network access device to transmit the notification to the mobile device where it will be output.

In block 226, the ECU may identify an obsolete notification based on one or more of the sensor data, the remote data, the calendar data, the driver preferences, the predicted user action, the time value, or the like. As an example of sensor data, a location sensor may detect data indicating that the vehicle has moved on from a gas station (or a fuel gauge may indicate that the vehicle has been refueled), so the ECU may determine that a notification requesting whether the vehicle should pay for fuel is obsolete.

As an example of using remote data, the vehicle may be parked at a gas station. Based on this detected location the ECU may output a notification requesting whether the vehicle should pay for fuel. However, the mobile device of the user may detect location data indicating that the user is getting on a train. Based on this received information, the ECU may determine to remove the notification.

As an example of using calendar data, the calendar associated with a user may indicate that a user has an appointment from 3-4 PM. At 4 PM, the ECU may determine that a notification associated with the meeting is obsolete because the meeting has concluded.

As an example of using driver preferences, the ECU may learn that the driver likes to drive with relatively low tire pressure (e.g., if the driver is off-roading with the vehicle). If a notification exists to inflate the tires and the tire pressure is only slightly low then the ECU may determine that this notification is obsolete.

As an example of using predicted user action, the ECU may predict that the user will want to travel along a predicted route to a destination and may output a notification indicating the predicted route. However, after the user fails to take a turn corresponding to the route, the ECU may determine that the notification is obsolete.

As an example of using the time value, the ECU may output a notification requesting verification of whether the vehicle should pay for fuel while the vehicle is parked at a gas station. However, after expiration of a predetermined amount of time (such as 20 minutes), the ECU may determine that the notification is obsolete. As another example, if the user parks at a bank on a Sunday, the ECU may determine that any notification corresponding to bank transactions is obsolete because banks are closed on Sundays.

In block 228, the ECU may control the memory to remove the obsolete notification from the notification center.

In block 230, the ECU may determine a new priority notification (in a similar manner as performed above in block 216) and may determine that the new priority notification has a highest priority ranking (in a similar manner as performed in block 220).

In block 232, the ECU may add the new priority notification to the notification center, in a similar manner as block 218.

In block 234, the ECU may control the output device to cease outputting the previously-output notification(s) and to output the new priority notification.

In block 236, the ECU may identify that the new priority notification is obsolete. For example, the ECU may make this determination in a similar manner as in block 226 based on any of the factors discussed.

In block 238, the ECU may control the output device to cease outputting the new priority notification in response to determining that it is obsolete. The ECU may control the memory to remove the new priority notification from the notification center. In some embodiments, the ECU may control the output device to output the previously-output notification in block 238.

Figure 3:
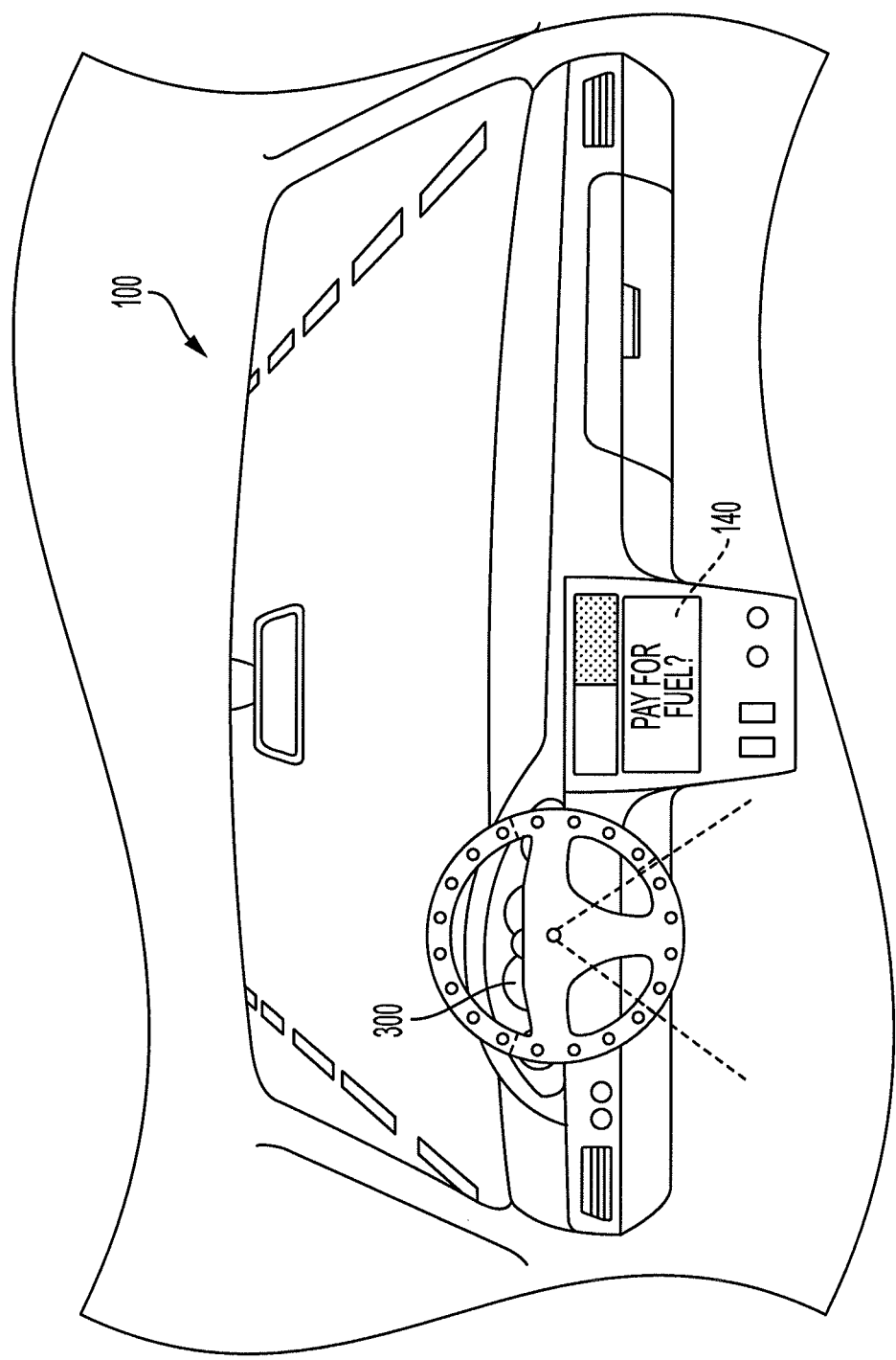
FIG. 3 is a drawing illustrating an interior of the vehicle of FIG. 1 according to an embodiment of the present invention.

Referring now to FIGS. 3 and 4, an implementation of the method 200 of FIGS. 2A, 2B, and 2C by the vehicle 100 is shown. The vehicle 100 includes the output device 140, as well as a secondary output device 300. As the vehicle 100 parks at a gas station 400, the ECU may determine that the vehicle is low on fuel and is parked at the gas station 400. The ECU may then control the output device 140 to output a notification requesting whether the vehicle 100 should wirelessly transfer funds to the gas station 400 to pay for fuel.

While the vehicle 100 is at the gas station 400, the driver may fail to respond to the notification. After expiration of a predetermined amount of time (or after the vehicle has been shut off, or after a pressure sensor detects that the driver has left the vehicle 100), the ECU may determine that the notification is obsolete and control the output device to cease outputting the notification.

After leaving the gas station 400, the ECU may determine that the tire pressure is low. The ECU may output a notification via the output device 140 or the output device 300 indicating that the tire pressure is low. The ECU may further identify a vehicle repair shop 402 along the route of the vehicle 100. The ECU may control the output device 140 or the output device 300 to output a location of the repair shop 402 or directions to the repair shop 402. After determining that the tire pressure has returned to normal, the ECU may determine that the low tire pressure notification is obsolete and cause the output device to cease outputting the notification.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for controlling notifications in a vehicle comprising:
    an output device configured to output data;
    a sensor configured to detect sensor data corresponding to at least one of a vehicle condition of the vehicle or an environment of the vehicle;
    a memory configured to store a notification center including notifications to be output by the output device; and
    an electronic control unit (ECU) coupled to the output device, the sensor, and the memory and configured to:
        determine a new notification to be added to the notification center based on the sensor data,
        add the new notification to the notification center,
        determine a priority of each of the notifications in the notification center,
        control the output device to output a highest priority notification from the notification center,
        identify an obsolete notification to be removed from the notification center based on the sensor data,
        remove the obsolete notification from the notification center,
        determine a new priority notification corresponding to a highest priority task to be added to the notification center, and
        control the output device to suspend outputting previously-output notifications and to output the new priority notification until the highest priority task is completed.

2. The system of claim 1 wherein:
    the sensor includes a location sensor configured to detect a current location of the vehicle;
    the obsolete notification corresponds to a previous location of the vehicle; and
    the ECU is configured to identify the obsolete notification in response to the current location of the vehicle being farther than a predetermined distance away from the previous location of the vehicle.

3. The system of claim 1 further comprising a network access device configured to receive remote data from a remote device, wherein the ECU is further configured to identify the obsolete notification based on the remote data.

4. The system of claim 3 wherein the remote data includes remote sensor data from a remote sensor of the remote device, and the ECU is further configured to identify the obsolete notification based on the remote sensor data.

5. The system of claim 4 wherein the remote device is a mobile device and the remote sensor data includes a current location of the mobile device.

6. The system of claim 1 wherein the ECU is further configured to identify a time value corresponding to a current date or a current time, and the ECU is further configured to identify the obsolete notification based on the time value.

7. The system of claim 1 wherein the ECU is further configured to receive calendar data associated with a user of the vehicle, and to identify the obsolete notification based on the calendar data.

8. The system of claim 1 wherein the sensor data corresponds to the vehicle condition and includes at least one of improper operation of a vehicle component, a vehicle speed, or a current traffic condition.

9. The system of claim 1 wherein the ECU is further configured to learn driver preferences based on previous driver interaction with the vehicle, and to identify the obsolete notification based on the driver preferences.

10. The system of claim 1 wherein the ECU is further configured to predict a user desired action to be performed by a vehicle user based on the sensor data, and to further determine the new notification based on the user desired action.

11. A system for controlling notifications in a vehicle comprising:
an output device configured to output data;
a sensor configured to detect sensor data corresponding to at least one of a vehicle condition of the vehicle or an environment of the vehicle;
a memory configured to store a notification center including notifications to be output by the output device; and
an electronic control unit (ECU) coupled to the output device, the sensor, and the memory and configured to:
predict a user desired action to be performed by a vehicle user based on the sensor data,
determine a new notification to be added to the notification center based on the user desired action,
add the new notification to the notification center,
determine a priority of each of the notifications in the notification center,
control the output device to output a highest priority notification from the notification center,
identify an obsolete notification to be removed from the notification center,
remove the obsolete notification from the notification center,
receive calendar data associated with a user of the vehicle, and
identify the obsolete notification based on the calendar data.

12. The system of claim 11 wherein the ECU is further configured to learn driver preferences based on previous driver interaction with the vehicle, and to identify the obsolete notification based on the driver preferences.

13. The system of claim 11 wherein the ECU is further configured to determine a new priority notification corresponding to a highest priority task to be added to the notification center, and to control the output device to suspend outputting previously-output notifications and to output the new priority notification until the highest priority task is completed.

14. The system of claim 11 further comprising a network access device configured to receive remote sensor data from a remote sensor of a remote device, wherein the ECU is further configured to identify the obsolete notification based on the remote sensor data.

15. A method for controlling notifications in a vehicle comprising:
detecting, by a sensor, sensor data corresponding to at least one of a vehicle condition of the vehicle or an environment of the vehicle;
storing, in a memory, a notification center including notifications to be output by an output device;
determining, by an electronic control unit (ECU), a new notification to be added to the notification center based on the sensor data;
adding, by the ECU, the new notification to the notification center;
determining, by the ECU, a priority of each of the notifications in the notification center;
controlling, by the ECU, the output device to output a highest priority notification from the notification center;
learning, by the ECU, driver preferences based on previous driver interaction with the vehicle;
identifying, by the ECU, an obsolete notification to be removed from the notification center based on the sensor data and based on the driver preferences; and
removing, by the ECU, the obsolete notification from the notification center.

16. The method of claim 15 further comprising predicting, by the ECU, a user desired action to be performed by a vehicle user, wherein determining the new notification includes determining the new notification based on the user desired action.

17. The method of claim 15 further comprising:
determining, by the ECU, a new priority notification corresponding to a highest priority task to be added to the notification center; and
controlling, by the ECU, the output device to suspend outputting previously-output notifications and to output the new priority notification until the highest priority task is completed.

18. A system for controlling notifications in a vehicle comprising:
an output device configured to output data;
a sensor configured to detect sensor data corresponding to at least one of a vehicle condition of the vehicle or an environment of the vehicle;
a memory configured to store a notification center including notifications to be output by the output device; and
an electronic control unit (ECU) coupled to the output device, the sensor, and the memory and configured to:
predict a user desired action to be performed by a vehicle user based on the sensor data,
determine a new notification to be added to the notification center based on the sensor data and based on the user desired action,
add the new notification to the notification center,
determine a priority of each of the notifications in the notification center,
control the output device to output a highest priority notification from the notification center,
identify an obsolete notification to be removed from the notification center based on the sensor data, and
remove the obsolete notification from the notification center.

19. The system of claim 18 wherein the ECU is further configured to receive calendar data associated with a user of the vehicle, and to identify the obsolete notification based on the calendar data.

20. The system of claim 18 wherein the ECU is further configured to learn driver preferences based on previous driver interaction with the vehicle, and to identify the obsolete notification based on the driver preferences.

* * * * *